United States Patent
Aoki

[11] Patent Number: 5,060,069
[45] Date of Patent: Oct. 22, 1991

[54] ELECTRONIC STILL CAMERA WITH LESS ELECTRIC CONSUMPTION

[75] Inventor: Akira Aoki, Tokyo, Japan

[73] Assignee: Fuji Photo Film Co., Ltd., Minami-Ashigara, Japan

[21] Appl. No.: 485,510

[22] Filed: Feb. 27, 1990

[30] Foreign Application Priority Data

Mar. 7, 1989 [JP] Japan ................................. 1-52927

[51] Int. Cl.⁵ ........................................... H04N 5/225
[52] U.S. Cl. ................................ 358/209; 358/213.15; 358/909
[58] Field of Search ................. 358/209, 909, 906, 41, 358/213.31, 335, 13, 44, 43, 181, 180, 160, 133

[56] References Cited

U.S. PATENT DOCUMENTS

| | | | |
|---|---|---|---|
| 4,682,232 | 7/1987 | Takayama et al. | 358/172 |
| 4,740,828 | 4/1988 | Kinoshita | 358/48 |
| 4,758,883 | 7/1988 | Kawahara et al. | 358/44 |
| 4,843,475 | 6/1989 | Iwai | 358/225 |
| 4,928,137 | 5/1990 | Kinoshita | 358/213.16 |

FOREIGN PATENT DOCUMENTS 0078280 5/1982 Japan.
0059876 4/1985 Japan.
0247166 11/1986 Japan.

Primary Examiner—James J. Groody
Assistant Examiner—Safet Metjahic

[57] ABSTRACT

An electronic still camera includes a picture signal processing circuit and a compression processing circuit. A photographed picture signal is subject to compression processing in the compressing processing circuit after being processed in the picture signal processing circuit. Electric power supply from a power source circuit is controlled by a control circuit. Electric power is supplied only to the picture signal processing circuit at the time of picture processing, while electric power is supplied only to the compression processing circuit at the time of compression processing. In this way, electric power supply is controlled, resulting in savings of electric consumption and improving the picture quality.

9 Claims, 2 Drawing Sheets

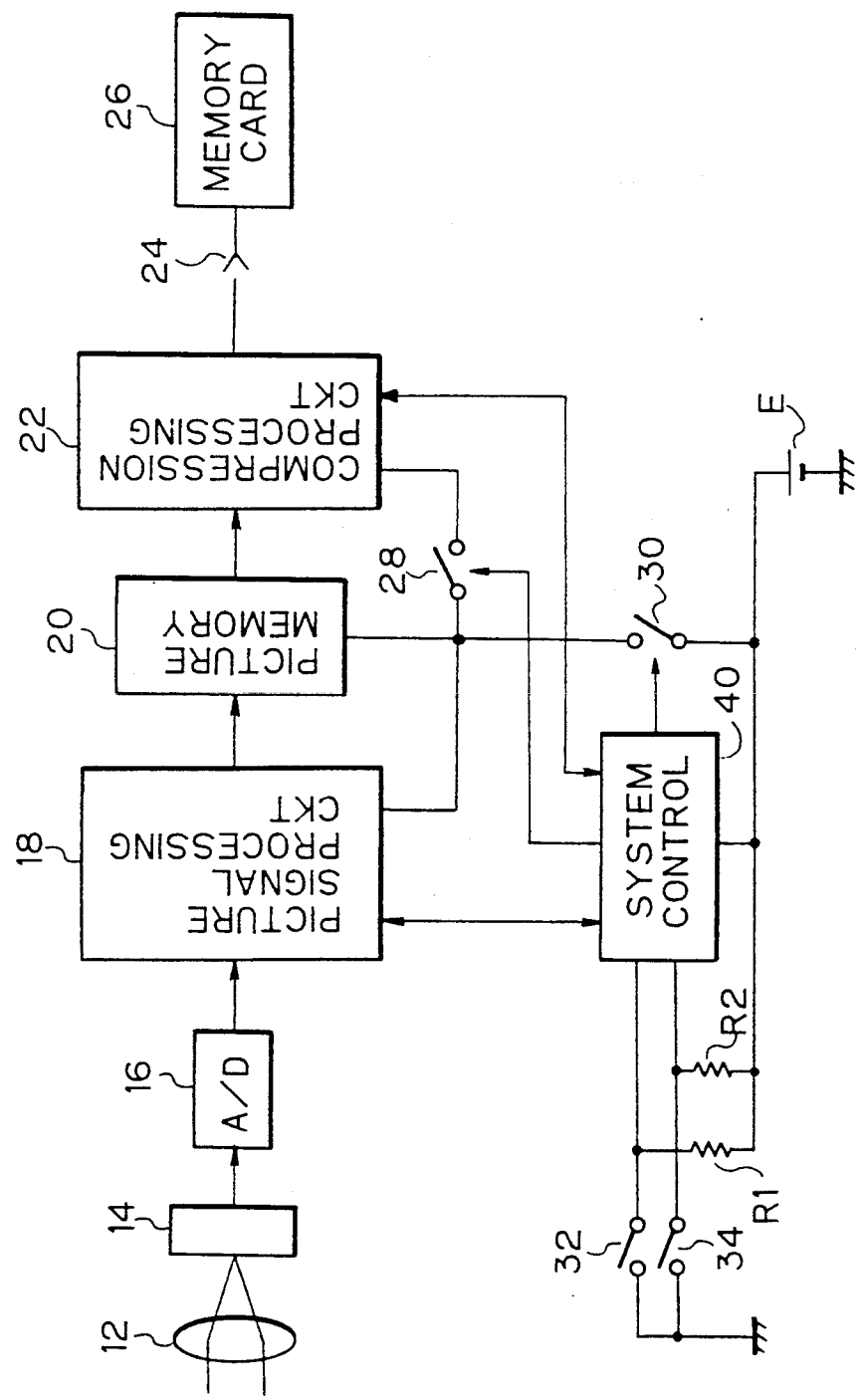

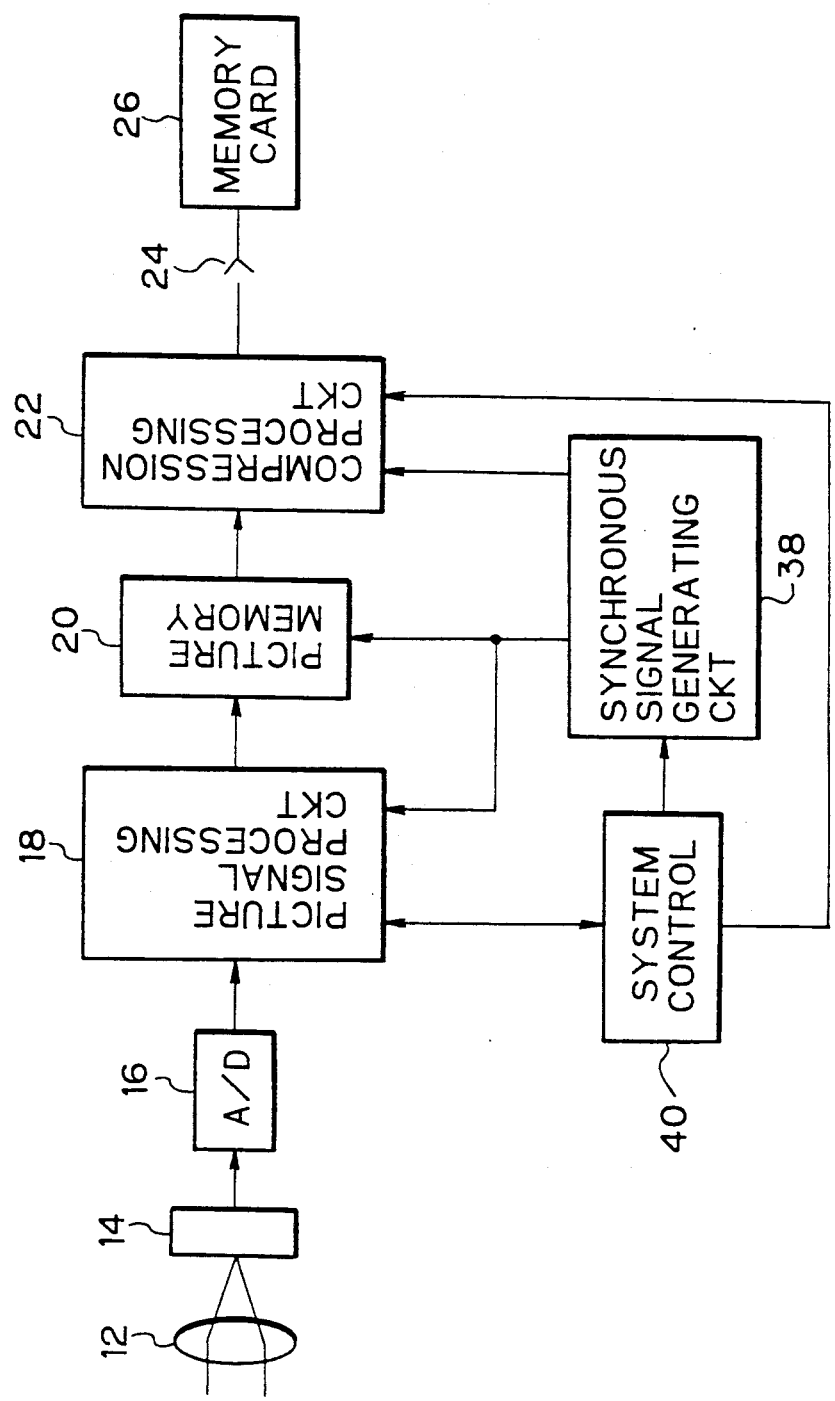

ELECTRONIC STILL CAMERA WITH LESS ELECTRIC CONSUMPTION

BACKGROUND OF THE INVENTION

1. Field of the Invention

The present invention relates to an electronic still camera, especially one which photographs an object to record in a recording medium the picture data representative of the object.

2. Description of the Related Art

The electronic still camera photographs an object, converts the obtained picture signals into digital data, processes the picture data for color correction, gradation control, and color separation and records the picture signals in a memory card or a magnetic disc. In the case that the picture data obtained by photographing an object is stored in a memory, various compression coding is carried out in order to reduce the data quantity for saving the storage capacity of the memory. A two-dimensional orthogonal transform coding method, for example, is extensively used, since this method can encode the picture signals at high compressibility and control the distortion of the picture due to encoding.

In the camera that processes such compression coding, electric power is, in general, supplied always from the power source to both a circuit which carries out the afore-mentioned picture processing and a circuit which carries out the compression coding. Consequently, even when only one circuits is operated, electric power is supplied to both circuits, resulting in increased electric consumption.

Further, there has been a problem of deterioration of the picture quality due to an influence of noise generated from the compression processing circuit when the picture processing circuit processes picture signals.

SUMMARY OF THE INVENTION

It is, therefore, an object of the present invention to provide an electronic still camera which aims at eliminating defects found in the related art so as to reduce electric consumption and deterioration of a picture quality.

In accordance with the present invention, an electronic still camera which records a still picture obtained by photographing an object has photographing means for taking a picture of an object, picture processing means for processing the picture signal picked up by the photographing means, compression means for carrying out compression processing of the picture signal processed with the picture processing means, and controlling means for controlling the picture processing means and the compression processing means. The controlling means disables the compression processing means, while the picture processing means processes the picture signal.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing an illustrative embodiment of an electronic still camera of the present invention; and FIG. 2 is a block diagram showing another illustrative embodiment of an electronic still camera of the present invention.

DESCRIPTION OF THE PREFERRED EMBODIMENTS

Referring to the annexed drawings, further details of the embodiments of an electronic camera of the present invention will be described hereunder.

FIG. 1 shows an illustrative embodiment of an electronic still camera of the present invention.

The electronic still camera has an optical system 12 through which an object image is focussed on an image sensor 14. A picture signal generated from the image sensor 14 is transmitted to a picture signal processing circuit 18 after having been converted into a digital signal through an A/D conversion circuit 16. The picture signal is processed in the picture signal processing circuit 18 for color correction, gradation control, and color separation. The processed picture signal is transmitted to a picture memory 20 and stored therein.

The picture signal stored in the picture memory 20 is read out in the form of a predetermined number of blocks and then transmitted to the compression processing circuit 22. The compression processing circuit 22 compresses and encodes the picture data input in each block under a certain compression coding scheme, such as two-dimensional orthogonal transformation, normalization, and Huffman coding. An output from the compression processing circuit 22 is transmitted to a memory card 26 through a connector 24 and recorded therein. The memory card 26 of the illustrative embodiment is a type of memory device incorporated therein, is detachably mounted on and electrically connectable to an electronic still camera through the connector 24.

A system control 40 monitors and controls functions of the camera, particularly monitors and controls operations of the picture signal processing circuit 18 and the compression processing circuit 22.

The picture signal processing circuit 18 and the picture memory 20 are connected to the power source E through a switch 30 so that they are supplied with electric power from the power source E through a switching operation of the switch 30. The compression processing circuit 22 is connected to the power source E through another switch 28 and the switch 30 so as to be supplied with electric power through switching operation of those switches. The switches 30 and 28 are operated in response to control signals from the system control 40.

The camera of the illustrative embodiment has two switches 32 and 34 that are operated in response to the shutter release button. The switch 32 is closed when the shutter release button is actuated in its half stroke. The switch 34 is closed by a shutter release. The switches 32 and 34 have one terminal grounded, and another terminal connected to the power source E through resistors R1 and R2 as well as to the system control 40, respectively. Consequently, when the switch 32 is closed in response to the shutter release button being in its half stroke, the voltage drop caused thereby is sensed by the system control 40. Also, when the switch 34 is closed by the shutter release operation, the voltage drop is provided to the system control 40. Thereby the system control 40 is, in response to the photographing action of the shutter to control switches 28 and 30 to supply the power source E to the picture signal processing circuit 18 and the compression processing circuit 22.

The operation of the camera of the illustrative embodiment will be explained hereunder.

When the shutter release button is depressed in its half stroke, the switch 32 is closed. As a result, the system control 40 detects the closed state of the switch 32 as stated above and transmits a control signal to the switch 30 to close the switch 30. Thereby electric power is supplied from the power source E to the picture signal processing circuit 18 and the picture memory 20.

When the shutter is opened, the switch 34 is closed. As a result, the system control 40 detects the closed state of the switch 34 as stated above and transmits a control signal to the picture signal processing circuit 18. The picture signal processing circuit 18 then processes a picture signal produced from the A/D conversion circuit 16, in response to a control signal transmitted from the system control 40. The processed, resultant picture signal data are stored in the picture memory 20. On the completion of the picture processing in the picture signal processing circuit 18, the system control 40 determines the completion of the picture processing based on a process end signal sent from the picture signal processing circuit 18 and transmits a control signal to the switch 28 to the contact of switch 28. Thereby electric power is supplied from the power source E to the compression processing circuit 22 also. After the compression processing circuit 22 is enabled, the compression processing circuit 22 starts compression processing according to the control signal received from the system control 40.

The compressed picture data are stored in the memory card 26 through the connector 24. When the compression process is completed in the compression processing circuit 22, the system 40 determines the completion of the compression process based on a compressor end signal transmitted from the compression processing circuit 22 and outputs a control signal to the switch 30 to open the contact of switch 30. Thereby supply of electric power from the power source E is stopped.

In accordance to the illustrative embodiment, when picture processing is carried out in the picture signal processing circuit 18, electric power is supplied only to the picture signal processing circuit 18, and thereafter electric power is also supplied to the compression processing circuit 22 while the compression process is carried out in the compression processing circuit 22. Consequently, unlike the related art in which electric power is always supplied to both of the picture signal processing circuit and the compression processing circuit, the electric consumption will be reduced.

Further, since electric power is not yet supplied when picture processing is carried out in the picture signal processing circuit 18, no noise is generated in the compression processing circuit 22. Consequently, the picture processing can be carried out without an influence of noise, resulting in improvement of the S/N ratio to enhance a picture quality.

FIG. 2 shows another illustrative embodiment of an electronic still camera of the present invention.

A camera illustrated in the figure has a synchronous signal generating circuit 38. The synchronous signal generation circuit 38 is controlled by a control signal received from the system control 40 and transmits synchronous signals to the picture signal processing circuit 18, the picture memory 20, and the compression processing circuit 22 to control those circuits in the desired sequence.

In the illustrative embodiment, when the shutter release button is in its half stroke, the system control 40 detects that state through the switch 32 shown in FIG. 1 or other detecting devices and outputs a control signal to the synchronous signal generating circuit 38. Thereby synchronous signals are generated from the synchronous signal generating circuit 38 to the picture signal processing circuit 18 and the picture memory 20 to bring those circuits into an operable state.

When the shutter is opened, the system control 40 detects the opening of the shutter through the actuation of the switch 34 shown in FIG. 1 or other detecting devices and transmits a control signal to the picture signal processing circuit 18. The picture signal processing circuit 18 processes the picture signal representative of the photographed picture, and then the processed picture signal data is stored in the picture memory 20.

When picture processing in the picture signal processing circuit 18 is completed, the system control 40 determines the completion thereof on the basis of an end signal received from the picture signal processing circuit 18 and transmits a control signal to the synchronous signal generating circuit 38. Thereby a synchronous signal is transmitted also to the compression processing circuit 22 from the synchronous signal generating circuit 38. After the compression processing circuit 22 is brought into an operable state, the compression processing circuit 22 carries out compression processing according to a control signal transmitted from the system control 40.

Because further details of the structure and actions of the illustrative embodiment are the same as those of the embodiment illustrated in FIG. 1, such an explanation will be omitted.

In accordance with the illustrative embodiment, when picture processing is carried out in the picture signal processing circuit 18, a synchronous signal is transmitted to the picture signal processing circuit 18, and then a synchronous signal is transmitted also to the compression processing circuit 22 while compression processing is carried out in the compression processing circuit 22. Consequently, since the picture signal processing circuit 18 is in its operable state only-n when picture processing is required to be carried out in the picture signal processing circuit 18, the electric consumption is reduced, unlike in the conventional electronic still camera in which electric power is always supplied to both picture signal processing circuit 22 and compression processing circuit 22.

In addition, there is no mixing of noise caused by operation of the compression processing circuit.

In accordance with the present invention, since operation of the compression processing circuit is stopped at the time of processing a picture by the picture processing circuit, it makes it possible to reduce the electric consumption as to well as improve the picture quality.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An electronic still camera for photographing an object to record a picture signal representative of a still image of the object in a semiconductor storage medium, comprising:

photographing means for taking an image of an object to produce a picture signal representative of the image of the object;

signal conversion means for converting the picture signal into a digital image data corresponding to the picture signal;

image processing means for processing the image data to produce a resultant picture signal;

compression processing means interconnected to said image processing means for compressing the resultant picture signal produced from said image processing means to develop the compressed picture signal to the semiconductor storage medium;

control means for controlling said image processing means and said compression processing means in response to a shutter release operation of said camera;

power source means for supplying said photographing means, said image processing means, said compression processing means and said control means with electric power; and switch means for connecting said power source means to said image processing means and said compression processing means;

said control means controlling said switch means to allow said image processing means to be interconnected to said power source means with said compression processing means disconnected from said power source means while said image processing means is in operation, and controlling said switch means to allow said compression processing means to be interconnected to said power source means while said compression processing means is in operation.

2. A camera in accordance with claim 1 wherein said switch means comprises:

a first switch responsive to said control means for connecting said power source means to said image processing means; and a second switch responsive to said control means for connecting said first switch means to said compression processing means;

said control means controlling said first switch to allow said image processing means to be interconnected to said power source means and said second switch to separate said compression processing means from said power source means while said image processing means is in operation, and controlling said second switch to allow said compression processing means to be interconnected to said power source means while said compression processing means is in operation.

3. A camera in accordance with claim 2 wherein said control means comprises:

signal operating means operative in response to a shutter release operation of said camera for generating a first signal representative of a half stroke of the shutter release operation and a second signal representative of a full stroke of the shutter release operation of said camera;

said control means being operative in response to the first signal to allow said first switch to interconnect said image processing means to said power source means with said second switch separating said compression processing means from said power source means, and said control means being operative in response to the second signal to allow said second switch to interconnect said compression processing means to said power source means.

4. A camera in accordance with claim 1, further comprising connector means interconnected to an output from said compression processing means for detachably connecting the semiconductor storage medium to the output from said compression processing means.

5. A camera in accordance with claim 4 wherein said semiconductor storage medium comprises a memory card.

6. An electronic still camera for photographing an object to record a picture signal representative of a still image of the object in a semiconductor storage medium, comprising:

photographing means for taking an image of an object to produce a picture signal representative of the image of the object;

signal conversion means for converting the picture signal into a digital image data corresponding to the picture signal;

image processing means responsive to a synchronous signal for processing the digital image data to produce a resultant picture signal;

synchronous signal generating means for generating a synchronous signal;

compression processing means interconnected to said image processing means and responsive to the synchronous signal for compressing the resultant picture signal produced form said image processing means to develop the compressed picture signal to the semiconductor storage medium;

control means for controlling said image processing means and said compression processing means in response to a shutter release operation of said camera; and power source means for supplying said photographing means, said image processing means, said compression processing means and said control means with electric power;

said control means controlling said synchronous signal generating means to allow said synchronous signal generating means to provide said image processing means with the synchronous signal without providing said compression processing means with the synchronous signal while said image processing means is in operation, and controlling said switch means to allow said synchronous signal generating means to provide said compression processing means with the synchronous signal while said compression processing means is in operation.

7. A camera in accordance with claim 6 wherein said control means comprises:

signal generating means operative in response to a shutter release operation of said camera for generating a first signal representative of a half stroke of the shutter release operation and a second signal representative of a full stroke of the shutter release operation of said camera;

said control means being operative in response to the first signal to allow said synchronous signal generating means to provide said image processing means with the synchronous signal without providing said compression processing means with the synchronous signal, and said control means being operative in response to the second signal to allow said synchronous signal generating means to provide said compression processing means with the synchronous signal.

8. A camera in accordance with claim 6, further comprising connector means interconnected to an output from said compression processing means for detachably connecting the semiconductor storage medium to the output from said compression processing means.

9. A camera in accordance with claim 8 wherein said semiconductor storage medium comprises a memory card.

* * * * *